US008060872B2

(12) United States Patent
Da Silva Neto

(10) Patent No.: US 8,060,872 B2
(45) Date of Patent: Nov. 15, 2011

(54) METHOD FOR TRANSMITTING A SOFTWARE CODE FROM A CONTROL UNIT TO A FIELD DEVICE OF PROCESS AUTOMATION TECHNOLOGY

(75) Inventor: Eugenio Ferreira Da Silva Neto, Biel-Benken (CH)

(73) Assignee: Endress + Hauser Process Solutions AG, Reinach (CH)

( * ) Notice: Subject to any disclaimer, the term of this patent is extended or adjusted under 35 U.S.C. 154(b) by 952 days.

(21) Appl. No.: 10/549,909

(22) PCT Filed: Mar. 24, 2004

(86) PCT No.: PCT/EP2004/003141
§ 371 (c)(1),
(2), (4) Date: Oct. 30, 2006

(87) PCT Pub. No.: WO2004/086156
PCT Pub. Date: Oct. 7, 2004

(65) Prior Publication Data
US 2007/0067767 A1    Mar. 22, 2007

(30) Foreign Application Priority Data
Mar. 25, 2003  (DE) .................... 103 13 389

(51) Int. Cl.
*G06F 9/44* (2006.01)
(52) U.S. Cl. ........................................ 717/177
(58) Field of Classification Search .............. 717/168, 717/172, 174, 177; 710/15
See application file for complete search history.

(56) References Cited

U.S. PATENT DOCUMENTS

| | | | | |
|---|---|---|---|---|
| 5,909,368 A | * | 6/1999 | Nixon et al. | 700/2 |
| 5,960,214 A | * | 9/1999 | Sharpe et al. | 710/15 |
| 6,738,388 B1 | * | 5/2004 | Stevenson et al. | 370/465 |
| 6,774,786 B1 | * | 8/2004 | Havekost et al. | 340/517 |
| 6,782,476 B1 | * | 8/2004 | Ishibashi | 713/169 |
| 6,924,663 B2 | * | 8/2005 | Masui et al. | 326/38 |
| 7,089,530 B1 | * | 8/2006 | Dardinski et al. | 717/105 |
| 7,233,745 B2 | * | 6/2007 | Loechner | 398/128 |
| 7,290,244 B2 | * | 10/2007 | Peck et al. | 717/109 |
| 7,337,369 B2 | * | 2/2008 | Barthel et al. | 714/43 |
| 2002/0077711 A1 | * | 6/2002 | Nixon et al. | 700/51 |
| 2002/0112044 A1 | * | 8/2002 | Hessmer et al. | 709/223 |
| 2003/0192032 A1 | * | 10/2003 | Andrade et al. | 717/124 |

(Continued)

FOREIGN PATENT DOCUMENTS

DE   101 12 843 A1   9/2001

(Continued)

OTHER PUBLICATIONS

FDT Joint Interest Working Group: "FDT Interface Specification Version 1.2", May 2001, XP002330295.

(Continued)

*Primary Examiner* — Anna Deng
(74) *Attorney, Agent, or Firm* — Bacon & Thomas, PLLC

(57) ABSTRACT

A method for transmitting a software code from a control unit to a field device of process automation technology. The inventive method is characterized in that the software code is integrated into a software module which encapsulates data and functions of the field device and which requires an operator control program for field devices as the runtime environment and which establishes the communication link with the field device.

4 Claims, 2 Drawing Sheets

U.S. PATENT DOCUMENTS

| | | | |
|---|---|---|---|
| 2005/0007249 A1* | 1/2005 | Eryurek et al. | 340/511 |
| 2005/0033886 A1* | 2/2005 | Grittke et al. | 710/107 |
| 2005/0046838 A1* | 3/2005 | Wittmer et al. | 356/328 |
| 2005/0143968 A9* | 6/2005 | Odom et al. | 703/21 |
| 2005/0177533 A1* | 8/2005 | Herzog | 707/1 |
| 2007/0067512 A1* | 3/2007 | Donaires et al. | 710/62 |

FOREIGN PATENT DOCUMENTS

| | | |
|---|---|---|
| DE | 100 42 602 A1 | 3/2002 |
| DE | 102 20 390 A1 | 12/2002 |
| DE | 101 30 862 A1 | 1/2003 |
| DE | 101 31 395 A1 | 1/2003 |
| DE | 101 31 394 A1 | 2/2003 |

OTHER PUBLICATIONS

N.N.: "FDT/DTM Field Device Tool—Offenes Enginerreing fur Feldgerate" Sep. 2001, Profibus International Support Center, Karlsruhe, XP002330296.

* cited by examiner

METHOD FOR TRANSMITTING A SOFTWARE CODE FROM A CONTROL UNIT TO A FIELD DEVICE OF PROCESS AUTOMATION TECHNOLOGY

FIELD OF THE INVENTION

The invention relates to a method for transmitting software code from a control unit to a field device of process automation technology.

BACKGROUND OF THE INVENTION

In process automation technology, field devices are often used for registering and/or influencing process variables. Examples of such field devices are fill level meters, mass flow measuring devices, pressure and temperature measuring devices, etc., which, as sensors, register the corresponding process variables fill level, flow rate, pressure and temperature.

Serving for the influencing of process variables are so-called actuators, e.g. valves, which alter the flow rate of a liquid in a section of a pipeline, or pumps, which alter fill level in a container.

A large number of such field devices are manufactured and sold by the firm Endress+Hauser.

As a rule, the field devices are connected via a fieldbus (Profibus®, Foundation® Fieldbus, etc.) with control systems or control units. These serve for process control, process visualization, process monitoring, as well as for configuring and parametering of the field devices.

The field devices perform various functions within the process control. For specific standard functions, so-called function blocks with defined communication interfaces are available. These function blocks form with corresponding algorithms, which are executed in the microprocessors of the individual field devices, special application functions. Field devices with microprocessors are referred to as intelligent, or smart, field devices. A significant aspect of the function blocks is that they have defined interfaces and, therewith, can be linked together by, from relatively simple up to very complex, control strategies, which are divided among different field devices.

In the Foundation Fieldbus Specifications, which are publicly available, various standard function blocks are specified. Typical function blocks for field devices are: "Analog Input"; "Analog Output"; "Discrete Input"; "Discrete Output"; "PID-Control". Along with these basic function blocks, there are also special function blocks: "Analog Alarm"; "Arithmetic"; "Device Control". Recently, also flexible function block are specified by Foundation Fieldbus (e.g. Supervisory Data Acquisition); these are freely programmable according to the IEC-Standard 61131. Reference is also made to the IEC-Standard 51158, in which, besides various fieldbus systems, also the Foundation® Fieldbus-technology is specified.

In order to change function blocks, the corresponding software code must be replaced in the memory of the field device. This is most often done by replacing the corresponding memory element (EEPROM). Another possibility is to transfer the new program part (i.e. the new software code), e.g. from a laptop, using a service-interface provided on the field device. To this end, however, manufacturer-specific programs, so-called (software-) tools are needed. As a rule, also the transmission protocols are proprietary.

Before a field device can be put in use, it must be configured and parametered. For this, among other things, the loading of the control strategy into the corresponding field devices is necessary. A known application, which enables this, is the SYSCON system of the company, SMAR. With this application, also the correct interconnecting of the individual function blocks, as well as the chronological sequencing of the control strategy, can be tested.

Often in process automation technology, field devices of different manufacturers are used, for whose complete parametering and configuring manufacturer-specific operating programs are required. These are generally also referred to as "tools", i.e. operating programs (e.g. CommuWin® of the firm Endress+Hauser), which run on computer units, such as e.g. workstations or laptops. In order to enable a universal operating of field devices of different manufacturers, an industry standard, FDT (Field Device Tool)-Specifications, was created by the PNO (Profibus® Nutzerorganisation). Device manufacturers provide their field devices with device-specific software modules, DTMs (Device Type Managers), which encapsulate all data and functions of a field device. Along with this, graphical operating elements are provided at the same time. For execution, the DTMs require, as runtime environment, an FDT frame application (FDT container). Such can be a simple operating program (configuring tool) or a control system application (engineering tool). The FDT Specifications only specify the interfaces, not, however, their implementation.

The underlying software-architecture is based on the Microsoft COM/DCOM technology. DTMs are implemented as COM components (COM server) and are the software interfaces via which the FDT frame application obtains access to the physical field device. The graphical operating elements are implemented as Microsoft ActiveX controls. Via these graphical interfaces, the user obtains a simple access to the physical field device. Besides the field devices, also other devices must be linked into the FDT-frame application. These devices, which, e.g. in the form of gateways and fieldbus adapters, assume communication tasks, require so-called communication-DTMs. A communication-DTM (CommDTM) contains all communication functions and dialogs, via which one can influence and activate the parameters of the network, or bus connection, as the case may be. These elements are normally likewise implemented as ActiveX controls. In the case of the standardized FDT-interface, the CommDTM replaces the currently usual manufacturer-specific configuration software of a network, or fieldbus interface, as the case may be. The communication channel CommChannel corresponds to the driver libraries.

Currently, for operating and configuring field devices and for changing software code in field devices, one needs different, manufacturer-specific programs (tools). Especially the changing of software code in field devices is very complex and can, as a rule, only be done by a technician on-sit, right at the field device. The programs required for this must be, with much effort, produced and tested. If the process automation installation of the user contains field devices of different manufacturers, then different operating programs and different programs for changing software code are needed. This is extremely unsatisfactory for the user.

SUMMARY OF THE INVENTION

An object of the present invention is, therefore, to provide a method for transferring software code from a computer unit to a field device of process automation technology, wherein the method is distinguished by being simple to perform, at favorable cost.

This object is achieved by integrating the software code in a software module, which encapsulates data and functions of the field device and requires, as runtime environment, an operating program for field devices; and establishing a communication connection with the operating program and the field device, resulting in a transfer of the software code via the communication connection.

An essential idea of the invention is to integrate the software code that needs to be loaded into the field device first into a software module, which encapsulates various data and functions of the field device and which requires, as runtime environment, an operating program for field devices. Via the operating program, the software module communicates with the field device. The software module represents essentially the software driver for the field device, with all device-specific functions and dialogs, as well as the user interface for parametering, configuring, diagnosis and maintenance.

In a further development of the invention, the software module is a DTM (Device Type Manager) and the operating tool is a FDT-frame application, which both meet the FDT-Specifications.

In a further development of the invention, the software code is a function block. This function block can be constructed e.g. according to the Foundation® Fieldbus Specifications.

Such a function block contains, among other things, the algorithms, parameters and methods for the particular field device.

Since, during the transmission of a function block into a field device, the function block can be significantly tampered with, security mechanisms are needed for preventing a virus attack on the field device. In a further development of the invention, a shell application is installed in the field device. The shell application enables execution of the function block, which is to be transferred into the field device, in the field device.

BRIEF DESCRIPTION OF THE DRAWINGS

The invention will now be explained in greater detail on the basis of an example of an embodiment presented in the drawing, the figures of which show as follows.

DESCRIPTION OF THE PREFERRED EMBODIMENTS

Figure 1:
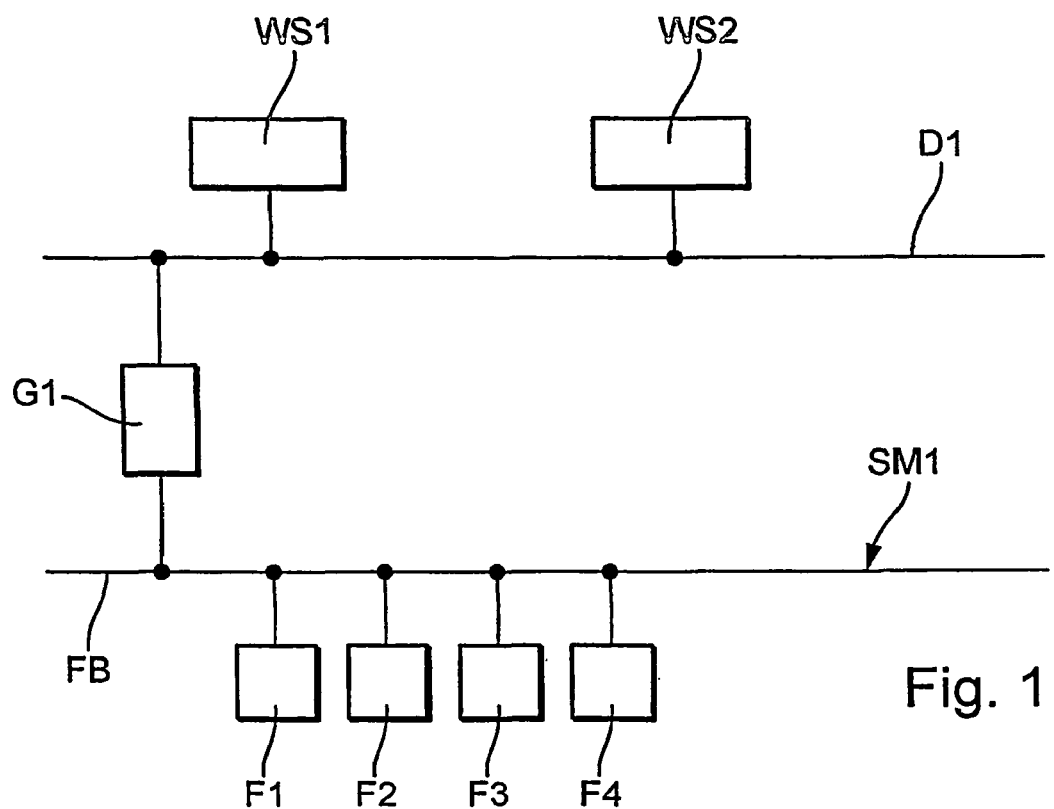
FIG. 1 schematic view of a network of process automation technology.

FIG. 1 details a network of process automation technology. Connected to a data bus D1 are a plurality of control systems, or units, (workstations) WS1, WS2, which serve for process visualization, process monitoring and for engineering. Data bus D1 works e.g. according to the HSE (High Speed Ethernet)-Standard of Foundation® Fieldbus. Via a gateway G, which is also referred to as a linking device, data bus D1 is connected with a fieldbus segment SM1. Fieldbus segment SM1 includes a plurality of field devices F1, F2, F3, F4, which are connected together via a fieldbus FB. Fieldbus FB works according to the Foundation Fieldbus Standard.

Figure 2:
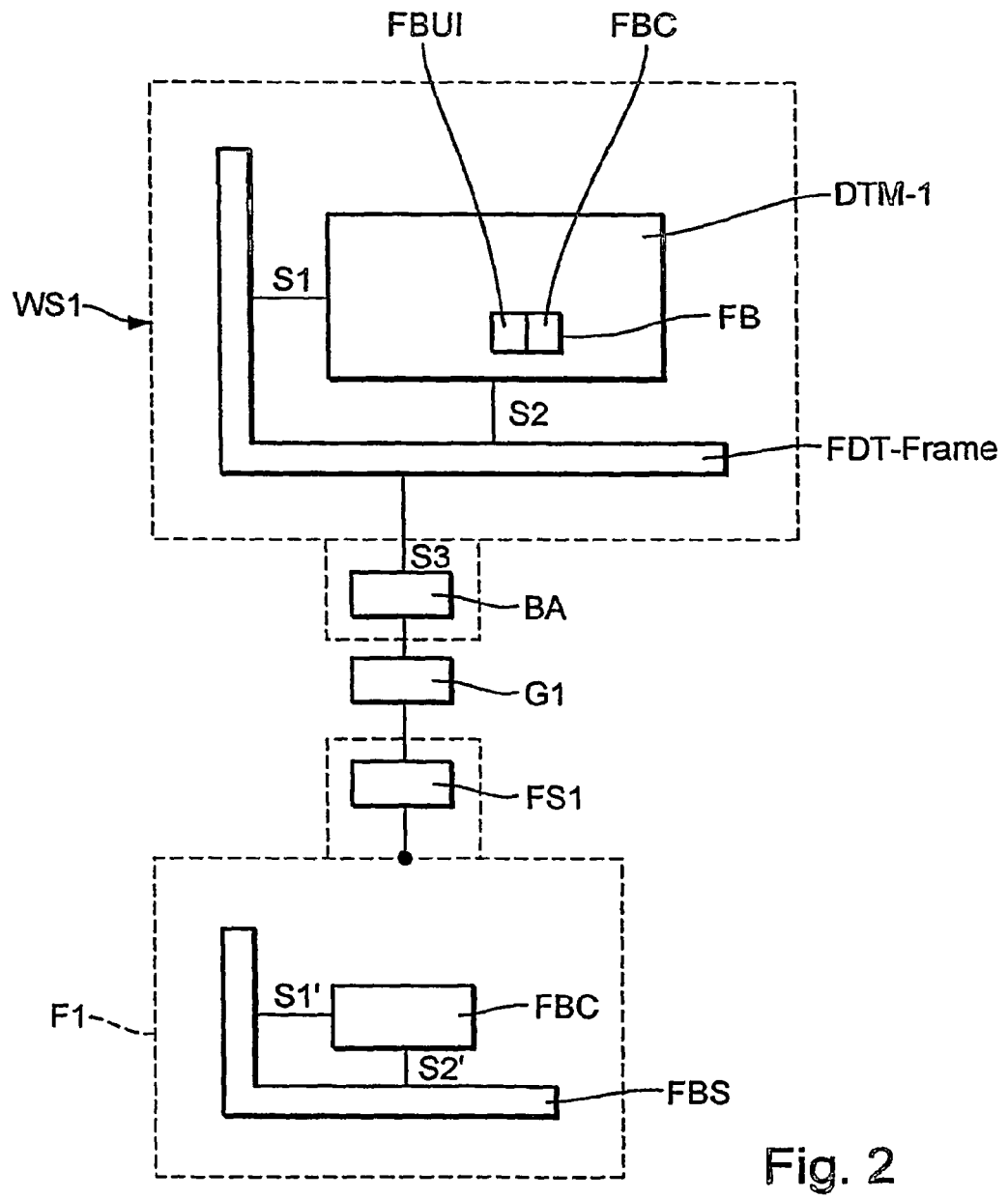
FIG. 2 schematic view of an FDT-frame application with connection to a field device.

FIG. 2 is a schematic representation of an FDT-frame application, which runs on one of the control units WS1, WS2. The FDT frame application can be the operating program PACTware® (PACTware Consortium e.V.) or Field-Care® (Endress+Hauser), which require a Windows® environment. The FDT-frame application is responsible for the project database, communications to the bus systems, management of the field device catalog, management of the users and access rights, etc. Via different interfaces S1, S2 (according to FDT-Specifications), an embedding of the software module DTM-1 occurs. DTM-1 is in the form of a DTM. DTM-1 encapsulates the data and functions of the field device F1 and requires, as runtime environment, the FDT-frame application. DTM-1 enables access to device parameters (online and offline), device adjustment and configuration, diagnosis of device status and a manufacturer-specific device adjustment with corresponding look and feel. DTM-1 also provides, in the form of independent Windows® applications, graphical elements for the adjusting of the field devices.

According to the FDT-concept, various DTMs of different manufacturers can be embedded into the FDT-frame application.

Via an interface S3, the FDT-frame application communicates with the field device F1. The hardware connection occurs via a bus connection BA, data bus D1, gateway G1, the fieldbus and the fieldbus interface FS1. Integrated in the DTM-1 is, additionally, a function block FB, which is composed of a function-block user-interface FBUI and the function-block software-code FBC of focus here. The software code of the function block FB is in the form of a function block according to the Foundation® Fieldbus Specifications. This function block includes e.g. algorithms, parameters or methods of the field device F1. Especially the parameters of the function block can be changed via the function-block user-interface FBUI.

The manner in which the invention operates will now be explained in greater detail. Parameter values can be transferred in a simple and known manner from the control unit, e.g. WS1, to the field devices F1, F2, F3, F4. First, the communication connection to the physical device is established. For this, FDT provides the communication channels CommChannels. Following the establishing of the communication connection, the software code FBC is transferred from the control unit, e.g. WS1, to the field device F1 in an appropriate manner, such as in the manner used for conventional parameter values. The establishing of the connection and the communication with the physical device is already part of the FDT specifications. For executing the software code in the field device F1, a function-block shell FBS with associated interfaces $S1^1$, $S2^1$ is provided. The function-block shell represents an application program interface between fieldbus stack and function-block applications. For preventing the transfer of software code foreign to the manufacturer into the field device, provision is made in the function-block shell for checking the authenticity of the DTMs. Only in the case of DTMs from DTMs certified by the manufacturer is the transfer of software into field devices of the manufacturer permitted. In this way, it is prevented that defective or virus-contaminated software code can get into the field device.

A manufacturer-specific program for transferring software code FBC to field devices is no longer necessary. A standard operating program is sufficient instead. With an operating program, the FDT-frame application, software code can be changed in field devices of different manufacturers. These changes can be carried out, without problem, by the user. To do this, it is only necessary to load the field device manufacturer-provided DTM with the changed software code into the control unit and initiate the process via a corresponding screen command "Execute Software Update".

The invention claimed is:

1. A method for transferring software code from a control unit to a field device of process automation technology, comprising the steps of:

integrating the software code in a software module, which represents the software driver of the field device and which encapsulates data and functions of the field device and requires, as runtime environment, an operating program for field devices, wherein the software module is provided in the form of a DTM (device type manager) according to FDT (Field Device Tool)-Specifications, and the operating program serves as a FDT-frame application;

establishing a communication connection with the operating program and the field device via the FDT-frame application;

checking an authenticity of said DTM by a function-block shell installed in the field device, wherein if said DTM is a DTM certified by a manufacturer:

transferring the software code via the communication connection to the field device; and executing the software code with the field device by using the function-block shell, wherein the function-block shell represents an application program interface between a fieldbus stack and function-block applications, and parameters of the function-block, which is composed of a function-block user interface and function-block software code, are changed via the function-block user interface.

2. The method as claimed in claim 1, wherein:
the software code corresponds to a function block.

3. The method as claimed in claim 2, wherein:
said function block is provided in the form of a function block according to Foundation Fieldbus Specifications.

4. The method as claimed in claim 2, wherein:
said function block includes algorithms, parameters or methods of the field device.

* * * * *